United States Patent [19]

Tsukuda

[11] Patent Number: 5,303,422

[45] Date of Patent: Apr. 12, 1994

[54] MOBILE AUDIO SYSTEM

[75] Inventor: Masami Tsukuda, Yokohama, Japan

[73] Assignee: Shintom Co., Ltd., Kanagawa, Japan

[21] Appl. No.: 985,452

[22] Filed: Dec. 3, 1992

Related U.S. Application Data

[63] Continuation of Ser. No. 468,099, Jan. 23, 1990, abandoned.

[30] Foreign Application Priority Data

Jan. 31, 1989 [JP] Japan .................................. 1-22084

[51] Int. Cl.⁵ .............................................. H04B 1/06
[52] U.S. Cl. ................................... 455/346; 455/348; 455/349; 455/351; 381/86; 381/88
[58] Field of Search ............... 455/291, 345, 346, 348, 455/349, 351; 381/86–88

[56] References Cited

U.S. PATENT DOCUMENTS

| | | | |
|---|---|---|---|
| 2,984,743 | 5/1961 | Scott | 455/346 |
| 3,071,728 | 1/1963 | Grace et al. | 455/346 |
| 4,135,158 | 1/1979 | Parmet | 455/345 |
| 4,441,086 | 4/1984 | Karlow et al. | 381/86 |
| 4,481,512 | 11/1984 | Tscheulin et al. | 455/346 |
| 4,947,457 | 8/1990 | Shin | 455/346 |
| 5,054,119 | 10/1991 | Rolland | 455/346 |

FOREIGN PATENT DOCUMENTS

| | | | |
|---|---|---|---|
| 2636579 | 3/1990 | France | 455/345 |
| 57-129202 | 2/1956 | Japan . | |
| 59-41052 | 3/1984 | Japan . | |
| 59-145088 | 9/1984 | Japan . | |
| 60-94885 | 6/1985 | Japan . | |
| 60-96889 | 7/1985 | Japan . | |
| 111084 | 7/1985 | Japan . | |
| 62-23749 | 2/1987 | Japan . | |
| 62-157189 | 10/1987 | Japan . | |
| 63-82654 | 5/1988 | Japan . | |
| 63-95280 | 6/1988 | Japan . | |

Primary Examiner—Reinhard J. Eisenzopf
Assistant Examiner—Andrew Faile
Attorney, Agent, or Firm—Oliff & Berridge

[57] ABSTRACT

A mobile audio system includes a mobile audio instrument having no internal amplifier, a first connector fixedly mounted on the back face of the instrument, a mounting and demounting unit for supporting the mobile audio instrument in a detachable manner, a second connector fixedly mounted on the mounting and demounting unit and having contacts each of which is electrically connected with the corresponding one of the contacts in the first connector and an external amplifier fixedly mounted on the mobile audio instrument and for amplifying line outputs from the second connector. Since the mobile audio instrument has no internal amplifier, the mobile audio system can be reduced in size and weight and improved for portability. In addition, the number of contacts can be reduced and the number of different types of contacts is decreased.

11 Claims, 4 Drawing Sheets

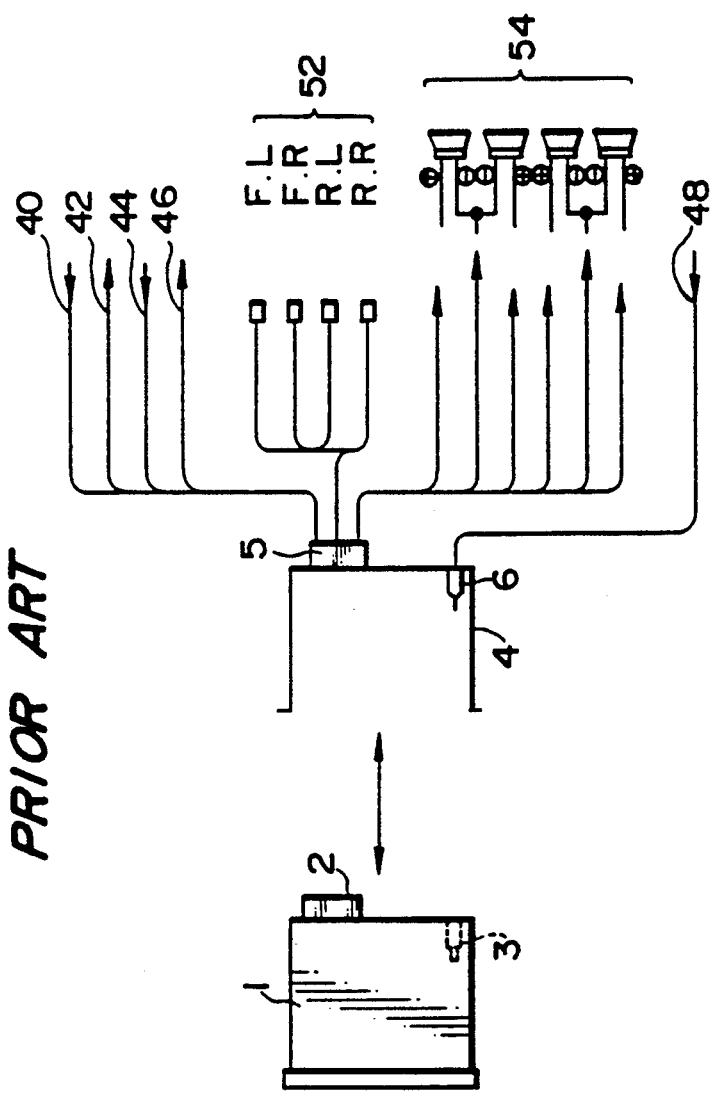

MOBILE AUDIO SYSTEM

This is a continuation of application Ser. No. 07/468,099 filed Jan. 23, 1990 now abandoned.

BACKGROUND OF THE INVENTION

1. Field of the Invention

The present invention relates to a mobile audio system capable of being detachably mounted in a vehicle and more particularly to such a system which is easily portable and capable of utilizing a connector having fewer contacts and the contacts all have the same signed carrying capacity.

2. Description of the Related Art

In order to prevent expensive high-performance mobile audio systems such as car radios, car stereo sets and others from being stolen, it has been proposed that they can be demountable and portable. Such proposals are disclosed, for example, in Japanese Laid-Open Utility Model Application Nos. 63-82654, 59-145088 and 59-40152. Furthermore, various structures for easily demounting mobile audio systems are disclosed, for example, in Japanese Laid-Open Utility Model Application Nos. 63-95280, 62-157189, 62-23749, 60-111084, 60-96889 and 60-94885. In addition, Japanese Laid-Open Utility Model Application 57-129202 discloses a mobile audio system which can be detachably mounted in and electrically connected to a vehicle through a connector.

Such anti-steal type mobile audio systems require a separation unit which increases manufacturing costs. Mobile audio systems are frequency sold as expensive high-performance audio sets. Such high-class audio sets frequency include high-power amplifiers. The high-power amplifier increases the weight of the mobile audio set which makes it less portable.

Where a connector is used to provide an electrical connection between a high-performance mobile audio system and a vehicle, the high-performance mobile audio system to have a large number of contacts in the connector. The mobile audio system including its power amplifier also requires special contacts to carry the amplifier signal.

In a mobile audio system with a radio, there is a further problem in that when the input of an antenna, handling weak signals, is connected with the radio adjacent to contact means for transmitting stronger or larger output signals, interference may be created, such as spurious oscillations, or the like. In the prior art, the antenna input section was placed remote from the mobile audio system. Thus, the input and output contacts could not be united into a single connector. This also provided a limitation of layout in the circuitry within the audio system.

Normally, reliable contacts in the connector are plated with a noble metal since they are repeatedly used when the mobile audio system are repeatedly mounted and demounted in the vehicle. On the other hand, remotely placed antenna contact means are fitting contacts which increase the area of contact. If the increased area of contact is placed with a noble metal, manufacturing cost are necessarily increased. Most frequently used antenna contact means which are not plated with a noble metal have a reliability problem during repeated use.

SUMMARY OF THE INVENTION

It is therefore an object of the present invention to provide an improved mobile audio system which can be detachably mounted in a vehicle and which is reduced in size and weight to be suitable for portability with fewer contacts and with the fewer different signal carrying contacts.

Another object of the present invention is to provide an improved mobile audio system which can include a radio having its antenna contacts provided in the same connector together with the other contacts, whereby the circuitry and layout in the audio system can be more easily designed.

Still another object of the present invention is to provide a mounting and demounting unit for various types of mobile audio systems which can be detachably mounted in vehicles for portability.

To this end, the present invention provides a mobile audio system comprising:

a mobile audio instrument which can be detachably mounted in a vehicle and which does not have an amplifier;

a first connector section fixedly mounted on the back face of said mobile audio instrument and including input and output contacts;

a mounting and demounting unit fixedly secured to the mobile and adapted to support said mobile audio instrument in a detachably manner;

a second connector section fixedly mounted on said mounting and demounting unit and adapted to perform electrical connection between the contacts of the first connector section and the second connector section when the mobile audio instrument is mounted in the vehicle; and an external amplifier fixedly mounted on said mounting and demounting unit and adapted to amplify the line output from said second connector section.

Since the mobile audio instrument of the present invention does not have an amplifier, even if the mobile audio instrument is a high-power instrument, the mobile audio instrument can be reduced in size and weight to be very suitable for portability.

Since the external amplifier does not require any speaker outputs from the mobile audio instrument itself, the number of contacts in the connector can be reduced by the number of speaker outputs in comparison with the conventional audio systems including amplifiers housed therein. The external amplifier can also reduce the capacity of contact in the connector.

As the output of the amplifier becomes larger, its temperature rises remarkably. Where an external amplifier is used, as in the mobile audio system of the present invention, it is not required to consider the rise of temperature caused by the amplifier in the mobile audio system. Furthermore, the external amplifier can contribute to improvement in service life and reliability.

Since the line output from the mobile audio system includes weak pre-amplifier signals, there will not be any interference between the line output and the antenna input even if they are handled by the same connector. Therefore, all the input and output contacts including the antenna input contacts can be housed within the common connector on the back face of a mobile audio instrument with a radio. Such connector contacts can be more easily plated with a noble metal to improve the reliability during repeated use and to increase the service life of the mobile audio instrument.

If it is desired to produce various types of mobile audio instruments having different power ratings, various types of external amplifiers may be correspondingly produced without any large modification to the mobile audio instruments themselves.

If various portable types of mobile audio instruments have been provided with similarly arranged first connector contacts and second connector contacts in a single mounting and demounting unit, the mobile audio instruments can be selectively mounted in the same vehicle.

BRIEF DESCRIPTION OF THE DRAWINGS

FIG. 5 is a schematic view illustrating a mobile audio system constructed according to the prior art.

DETAILED DESCRIPTION OF THE PREFERRED EMBODIMENTS

Figure 1:
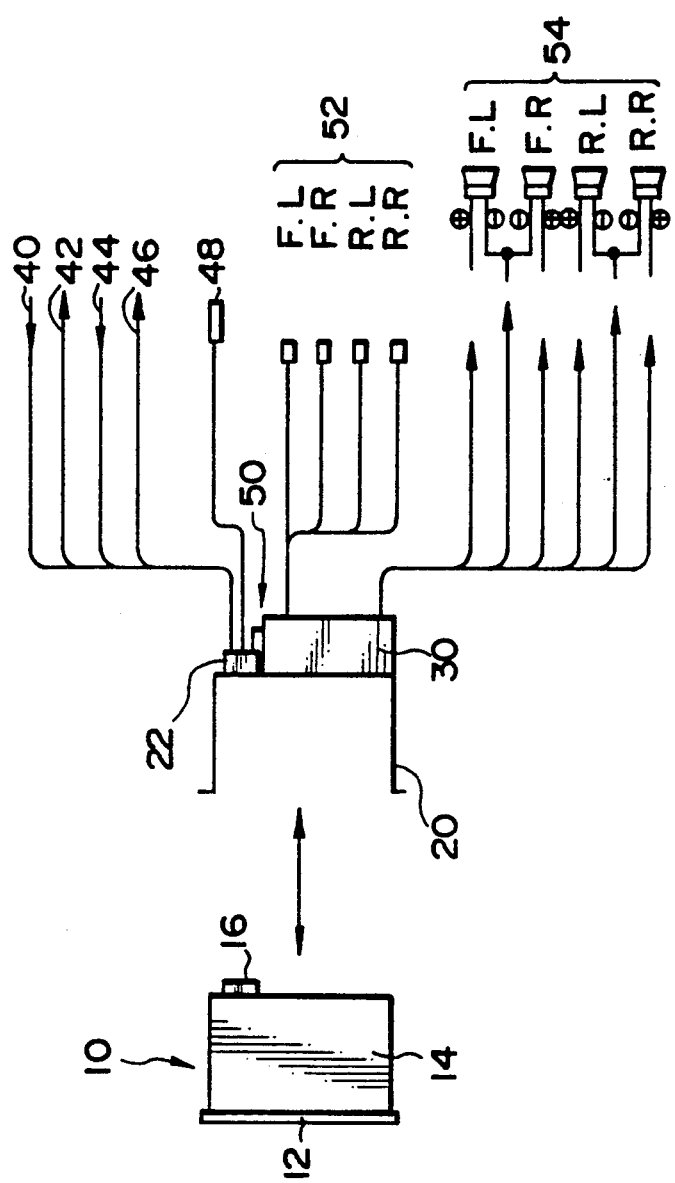
FIG. 1 is a schematic view illustrating one embodiment of a mobile audio system constructed according to the present invention.

Referring now to FIG. 1, there is shown a mobile audio instrument 10 which is one preferred embodiment of the present invention. The mobile audio instrument 10 comprises at least a radio section and may comprise, singly or in combination, the other devices such as cassette tape player, digital audio tape (DAT) player, compact disc (CD) player and others, if desired.

The mobile audio instrument 10 further comprises a front panel 12, a chassis 14 and an instrument-side connector 16 which is disposed on the back face of the chassis 14 and used as a first connector. The chassis 14 receives various circuit components such as a tuner, a volume controller, a circuit board and others as in the conventional chassises, except that it does not have an amplifier included therein.

A mounting and demounting unit 20 is fixedly mounted on the vehicle and detachably supports the mobile audio instrument 10. Both the unit twenty and instrument, 10 include various known mechanisms for performing engagement and disengagement therebetween in an easy and simple manner. The mounting and demounting unit 20 includes a unit-side connector 22 as a second connector which is fixedly mounted on the side of the unit 20 opposite to the instrument-side connector 16 in the mobile audio instrument 10.

Each of the connectors 16 and 22 includes eleven contacts of class 1A type which are plated with a noble metal to increase reliability during repeated use. The eleven contacts are common to each connector as follows:

| | |
|---|---|
| Ignition (IGN+) | 1 |
| Ground (GRD) | 1 |
| Battery | 1 |
| Auto-antenna | 1 |
| Antenna (INPUT, GND) | 2 |
| Line Output | 5 |
| -continued | |
| (F.L., F.R., R.L. and R.R. and common) | |

Among these contacts, the contact for an auto-antenna is not necessarily required. The number of the line outputs are selected to be equal to the number of speakers used.

Each of the contacts in the unit-side connector 22 is electrically connected with the corresponding one of an ING+ input cable 40, a GND cable 42, a battery input cable 44, an auto-antenna output cable 46, an antenna input cable 48 and an amplifier connecting cable 50.

In the illustrated embodiment, an external amplifier 30 is fixedly mounted on the mounting and demounting unit 20. Various classes of mobile audio systems may be realized by providing various types of such external amplifiers 30 having different outputs from normal power to high power and selecting one of these external amplifiers for the desired class of mobile audio system to be mounted in a vehicle.

The input of the external amplifier 30 is connected to the unit-side connector 22 through the amplifier connecting cable 50. The amplifier connecting cable 50 comprises three power cable sections (ING+, battery and auto-antenna) and five line output cable sections. The output of the external amplifier 30 includes six speaker output sections (F.L., F.R., R.L., R.R. and two commons) obtained by amplifying the line outputs and line output sections supplied directly from the unit-side connector 22. Thus, the output cable of the external amplifier 30 includes five line output cable sections 52 and six speaker output cable sections 54.

The mobile audio system will now be described in function.

When it is desired to receive radio signals in a vehicle, the mobile audio instrument 10 is first mounted on the mounting and demounting unit 20. As a result, the instrument-side connector 16 will be connected with the unit-side connector 22. Thereafter, an ignition switch is turned on such that electric power flows through the mobile audio instrument 10 and through the two connectors 16 and 22 which have been electrically connected with each other. If a radio mode switch on the front panel 12 is turned on, the tuner in the chassis 14 will receive antenna inputs through the antenna input cable 48, unit-side connector 22 and instrument-side connector 16. The tuner tunes and detects a signal depending on a frequency which has been selected by operating a tuning knob on the front panel 12. Line output signals will thus be supplied to the external amplifier 30 through the line output contacts in the two connectors 16 and 22 and also through the amplifier connecting cable 50. The external amplifier 30 amplifies the line outputs to the desired level, the amplified line outputs from the external being then supplied to the respective speakers through the speaker output cable 54.

In the above arrangement, the mobile audio instrument 10 does not require any internal amplifier. Thus, it can be reduced in size and weight by the size and weight of the internal amplifier. The amplifiers also generally require various heat dispersing means such as radiator plates and the like which are used to disperse heat from its electric circuits as well as amplifying transistors. Accordingly, its amplifiers must occupy a substantial space in the instrument. By providing an external amplifier, the mobile audio instrument can be greatly reduced in size and weight. Since the mobile audio instrument 10 of the present invention is detachably mounted on the mounting and demounting unit 20, the mounting and demounting operation can be relieved and improved for portability.

Furthermore, the temperature in the chassis 14 can be decreased by using the external amplifier in the mobile audio instrument 10. This results in decreased system failure due to heat build-up in the electric parts which increase service life and improves reliability.

The heat dispersion in the external amplifier 30 can be effectively accomplished since the chassis is not filled with heat, in comparison with the conventional instruments which include internal amplifiers. Where the external amplifier 30 is mounted on the mounting and demounting unit 20, the heat dispersion can be more effectively performed by making radiator plate means in the external amplifier 30, for example, from aluminum and directly mounting such radiator means of aluminum on the mounting and demounting unit 20.

According to the illustrated embodiment, each of the connectors 16 and 22 can receive all the input and output contacts including antenna input contacts and yet require fewer contacts. In addition, only one type of contact is required.

For comparison, a conventional type of mobile audio system will now be described with reference to FIG. 5.

As shown in FIG. 5, a mobile audio instrument 1 includes an internal amplifier mounted therein and also comprises an instrument-side connector 2 and an antenna connector 3, all of which are disposed on the back face of the mobile audio instrument 1. On the other hand, a mounting and demounting unit 4 comprises a unit-side connector 5 and an antenna connector 6.

In such an arrangement, relatively high-power speaker outputs amplified by the internal amplifier will be outputted through the connectors two and five. In order to prevent these high-power speaker outputs from interfering with weak antenna inputs, the antenna connectors 3 and 6 had to be disposed remotely from the other connectors.

The present invention provides weak pre-amplifier signals on the line outputs which will not interfere with the antenna input signals even though the antenna input contacts are disposed close to each other in the same connector. Thus, all the input and output contacts can be disposed integrally within only one connector 16. This results in facilitation of the electrical layout in the chassis 14. Since it is required to connect only a single connector with the instrument, the mobile audio instrument 10 can be easily mounted or demounted from the vehicle.

Since the antenna inputs are supplied through the connector contacts, these contacts can be plated with a noble metal to increase the durability in repeated use and to improve the reliability.

According to the illustrated embodiment of the present invention, the number of contacts may be equal to eleven in each of the connectors 16 and 22. On the other hand, the conventional instrument shown in FIG. 5 required a total of seventeen contacts comprising fifteen contacts in each of the connector 2 and 5 and two contacts for the antenna. In the illustrated embodiment of the present invention, six contacts can be removed from each of the connectors 16 and 22 since the speaker outputs are taken out from the external amplifier 30.

The types of contacts required will now be described below.

In the illustrated embodiment, all eleven contacts can be of class 1A type. On the other hand, the conventional instrument requires two IGN+ and GND contacts of class 10A type and also at least six speaker output contacts of class 5A type. This is because the conventional instruments must handle signals for driving their internal amplifiers and speaker output signals amplified by the internal amplifiers.

In the illustrated embodiment, all the contacts are required only to be of class 1A for weak currents since the external amplifier 30 is used in the mobile audio instrument. Thus, the number of contacts can be reduced and only one type of contact is required. Even if each of the contacts is plated with a noble metal, the manufacturing costs of the connectors is lowered.

By taking such an arrangement, various types of parts can be standardized even it many types of mobile audio sets are to be produced.

Particularly, if various types of instrument having different output levels are to be produced, it can be accomplished by selecting one of various external amplifiers 30. In comparison with the conventional instruments comprising internal amplifiers disposed therein, the mobile audio instrument 10 itself is not modified from its basic construction. Thus, the present invention can provide many variations of instrument from a relatively low-price instrument to a high-class instrument.

It is to be understood that the present invention is not limited to the aforementioned embodiment and can be embodied in various forms without departing from the concept of the present invention.

Figure 2:
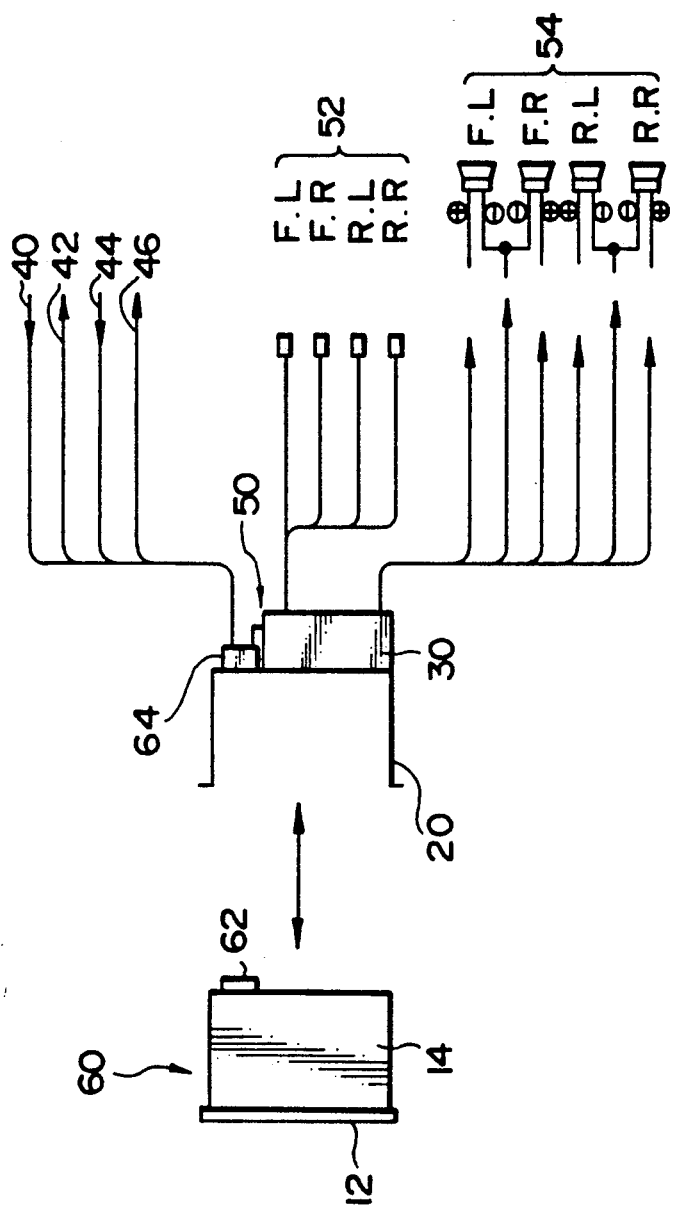
FIG. 2 is a schematic view illustrating another embodiment of the present invention which is applied to a mobile audio system having no radio.

FIG. 2 shows a mounting and demounting unit for a mobile audio reproducing instrument 60 having no radio.

The mobile audio reproducing instrument 60 may be of any one of tape cassette player, compact disc player, digital audio tape player and other instruments.

The mobile audio reproducing instrument 60 comprises a first connector 62 fixedly mounted on the back face thereof. The first connector 62 is similar to the first connector 16 shown in FIG. 1, except that the connector 62 lacks antenna contacts. A second connector 64 is fixedly mounted on the mounting and demounting unit 20. Similarly, the second connector 64 is similar to the second connector 22 shown in FIG. 1, except that the connector 64 lacks antenna contacts.

Normally, a radio set has been mounted in a vehicle. If the mobile audio producing instrument 606 is to be mounted in the vehicle as an optional part, no antenna contact is required as mentioned above. If the mobile audio instrument 10 with the radio is to be mounted in the vehicle as an optional part, it is required that the first connector 16 have the antenna contacts as shown in FIG. 1.

If each of the first and second connectors 62 and 64 has the same arrangement of contacts as in the corresponding one of the first and second connectors 16 and 22 shown in FIG. 1 except for antenna contacts, the mobile audio reproducing instrument 60 may be mounted on the mounting and demounting unit 20 shown in FIG. 1. In such a manner, a driver may select any one of an audio set with radio and various types of players, if desired. Where the mounting and demounting unit 20 is to be used together with various types of audio instruments, it is only required to provide a mobile audio reproducing instrument with a first connector having the same arrangement of contacts as in the second connector 22 or 64.

Figure 3:
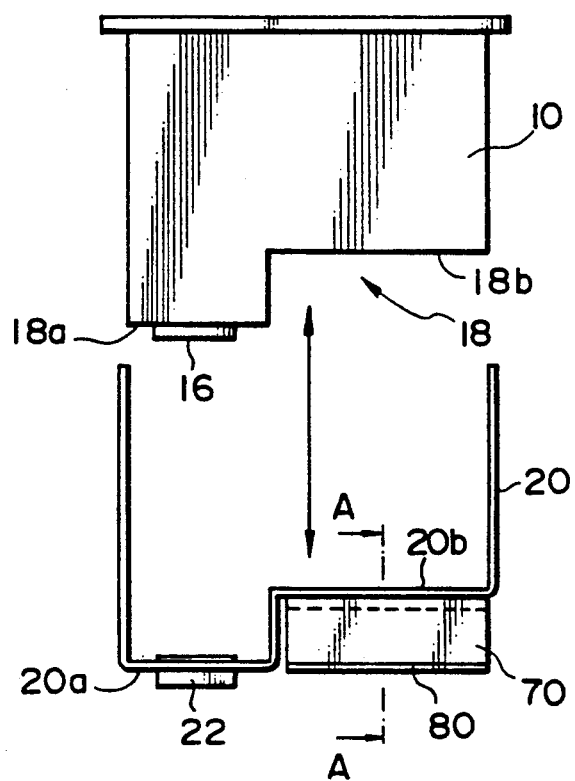
FIG. 3 is a schematic view showing a preferred form of a mounting and demounting unit which can co-operates with a mobile audio system according to the present invention.
Figure 4:
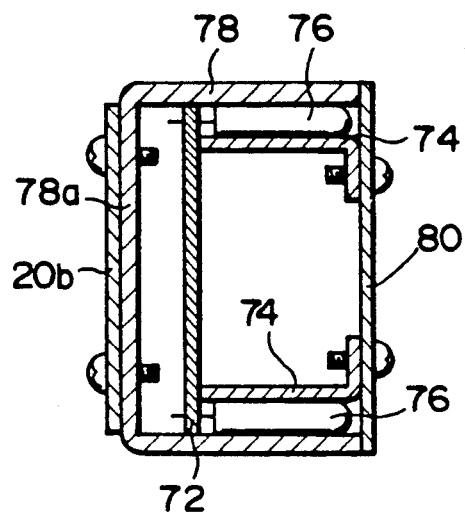
FIG. 4 is an enlarged cross-sectional view of FIG. 3 taken along a line A—A.

Referring now to FIGS. 3 and 4, there is shown a preferred form of said mobile audio instrument 10 and a preferred example of the mounting and demounting unit 20.

The mobile audio instrument 10 is partially cut out at the back face 18 thereof by an amount corresponding to a space occupied by an amplifier, this cut-out portion providing a stepped face 18b which is recessed from the mounting face 18a of the first connector section 16. On the other hand, the mounting and demounting unit 20 includes an amplifier mounting face 20b formed therein at a position opposite to the back face 18 of the mobile audio instrument 10. The amplifier mounting face 20b extends outwardly beyond the mounting face 20a of the second connector section 22. An external amplifier 70 is fixedly mounted on the amplifier mounting face 20b.

The external amplifier 70 comprises a printed circuit board 72 on which electric parts are mounted; an IC fitting 74 fixedly mounted on the printed circuit board 72; a power IC 76 firmly screwed to the IC fitting 74 and a channel-shaped radiator plate 78 of aluminium for holding the power IC 76 between the IC fitting 74 and the radiator plate 78. A protective cover 80 is firmly screwed to the IC fitting 74 at one side. The external amplifier 70 is mounted on the mounting and demounting unit 20 by screwing the back face 78a of the radiator plate 78 directly to the amplifier mounting face 20b of the mounting and demounting unit 20. This results in improvement of the heat dispersion. Therefore, the radiator plate 78 can be reduced in size, leading to the reduction of the entire system dimension.

If it is desired to provide an external amplifier having its output equal to 100W totalized from four channels F.R., F.L., R.R. and R.L. each having an output equal to 25W in accordance with the illustrated embodiment of the present invention, the mounting face 20a of the second connector section 22 in the mounting and demounting unit 20 can be flush with the protective cover 80 of the external amplifier 70 to maintain the mobile audio system including the mobile audio instrument 10 and the mounting and demounting unit 20 at the same external dimension as in the prior art.

What is claimed is:

1. A mobile audio system comprising:
   a mobile audio instrument having a body capable of being detachably mounted on a vehicle and having a radio and a pre-amplifier therein, said instrument having no internal power amplifier, whereby said instrument outputs a weak pre-amplified audio signal;
   a single first connector fixedly mounted on a back side of said mobile audio instrument, plural input and output contacts integrally provided in said single first connector, said input contacts including at least an antenna contact and said output contacts including at least line output contacts which carry said weak pre-amplified audio signal;
   a mounting and demounting unit fixedly mounted on the vehicle and adapted to support said mobile audio instrument in a detachable manner;
   a single second connector fixedly mounted on said mounting and demounting unit, plural second contacts integrally provided in said single second connector, each of said second contacts adapted to make an electric connection with the corresponding one of the contacts in said first connector when said mobile audio instrument is mounted in the vehicle; and
   an external power amplifier fixedly mounted at the back of said mounting and demounting unit, electrically connected to said second connector and adapted to amplify line outputs from said second connector.

2. A mobile audio system as defined in claim 1 wherein all of said input, output and second contacts are standardized to be of the same class of ampere.

3. A mobile audio system as defined in claim 2 wherein each of said input, output and second contacts is plated with a noble metal.

4. A mobile audio system as defined in claim 1, wherein said mounting and demounting unit can be used with different types of mobile audio instruments and wherein each of the different types of mobile audio instruments includes said first connector which has the same arrangement of contacts as the arrangement of contacts of the second connector on said mounting and demounting unit.

5. A mobile audio system as defined in claim 1, further comprising a mobile audio reproducing instrument, wherein said mounting and demounting unit can be used selectively with said mobile audio instrument and said mobile audio reproducing instrument, and wherein said mobile audio reproducing instrument does not require antennas, and a first connector section of the mobile audio reproducing instrument has the same arrangement of contacts as the arrangement of contacts of the second connector section except for the antenna contact.

6. A mobile audio system as defined in claim 1, wherein said back side of said mobile audio instrument is partially cut out by an amount corresponding to a space occupied by the external power amplifier, so that the back side of the mobile audio instrument has a stepped back face recessed from a mounting face of said first connector.

7. A mobile audio system as defined in claim 1, wherein said mounting and demounting unit can includes an amplifier mounting face to which said external power amplifier is mounted, said amplifier mounting face formed on said mounting and demounting unit at a position opposite to the stepped back face of said mobile audio instrument and extending outwardly beyond a mounting face of said second connector, and wherein a surface of said external power amplifier is substantially flush with the mounting face of said second connector.

8. A mobile audio system as defined in claim 5, wherein said mobile audio reproducing instrument includes a cassette tape player.

9. A mobile audio system as defined in claim 5, wherein said mobile audio reproducing instrument includes a digital audio tape player.

10. A mobile audio system as defined in claim 5, wherein said mobile audio reproducing instrument includes a compact disc player.

11. A mobile audio system as defined in claim 1, wherein said single first connector and said single second connector include ignition contacts, ground contacts and battery contacts.

* * * * *